US012436144B2

(12) United States Patent
Liu et al.

(10) Patent No.: US 12,436,144 B2
(45) Date of Patent: Oct. 7, 2025

(54) METHOD FOR EVALUATING REINFORCEMENT EFFECT AND EFFICIENCY OF FILLER ON NATURAL RUBBER BASED ON PARTICLE SIZE OF BOUND RUBBER PARTICLE FORMED BY THE FILLER AND NATURAL RUBBER LATEX

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Rongyao Tao, Taiyuan (CN); Wenqi Wang, Taiyuan (CN); Guizhe Zhao, Taiyuan (CN)

(73) Assignees: NORTH UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 0 days.

(21) Appl. No.: 19/028,108

(22) Filed: Jan. 17, 2025

(65) Prior Publication Data
US 2025/0172537 A1 May 29, 2025

Related U.S. Application Data

(63) Continuation of application No. PCT/CN2024/078122, filed on Feb. 22, 2024.

(30) Foreign Application Priority Data

Feb. 6, 2024 (CN) .......................... 202410169729.5

(51) Int. Cl.
*G01N 33/44* (2006.01)
*G01N 15/02* (2024.01)

(52) U.S. Cl.
CPC ........... *G01N 33/445* (2013.01); *G01N 15/02* (2013.01); *G01N 2015/0277* (2013.01)

(58) Field of Classification Search
CPC ................. G01N 33/445; G01N 15/02; G01N 2015/0277
See application file for complete search history.

(56) References Cited

U.S. PATENT DOCUMENTS

| 4,070,325 A | * | 1/1978 | Burke, Jr. | ................... | C08J 3/07 |
| | | | | | 524/239 |
| 2009/0036596 A1 | * | 2/2009 | Miyasaka | ................ | C08K 3/04 |
| | | | | | 524/575.5 |

(Continued)

FOREIGN PATENT DOCUMENTS

| CN | 101084258 A | 12/2007 |
| CN | 104109257 A | 10/2014 |

(Continued)

OTHER PUBLICATIONS

Yanchan Wei et al., "In-situ observation of spatial organization of natural rubber latex particles and exploring the relationship between particle size and mechanical properties of natural rubber", Industrial Crops and Products, vol. 180, Dec. 31, 2022, 1147371, pp. 1-10.

(Continued)

*Primary Examiner* — Arleen M Vazquez
*Assistant Examiner* — Lynda Dinh

(57) ABSTRACT

A method for evaluating reinforcement effect and efficiency of a filler on natural rubber based on particle size of bound rubber particles formed by the filler and natural rubber particle in a natural rubber latex, in which the natural rubber latex and the filler are mixed and diluted to obtain a to-be-detected emulsion, and an average particle size of bound rubber particles is measured using an instrument; a ratio of the average particle size to an average particle size of natural rubber particles in a pure rubber latex emulsion (Continued)

with the same concentration is calculated; the reinforcement effect of the filler on the natural rubber is evaluated based on the ratio; a function expression is established to derive a stress at definite elongation of various filler-modified natural rubber vulcanizates; and according to the function expression, the reinforcement efficiency of the filler on the natural rubber is evaluated.

7 Claims, 3 Drawing Sheets

(56) References Cited

U.S. PATENT DOCUMENTS

| | | | | |
|---|---|---|---|---|
| 2015/0011677 | A1* | 1/2015 | Kimura | C08J 3/22 |
| | | | | 523/156 |
| 2016/0168338 | A1 | 6/2016 | Soisson et al. | |
| 2019/0338084 | A1* | 11/2019 | Miyazaki | B60C 1/00 |
| 2020/0354530 | A1* | 11/2020 | Konno | B29D 30/00 |

FOREIGN PATENT DOCUMENTS

| | | | |
|---|---|---|---|
| CN | 105419003 | A | 3/2016 |
| CN | 107505480 | A | 12/2017 |
| CN | 109206679 | A | 1/2019 |
| CN | 111896775 | A | 11/2020 |
| CN | 112881662 | A | 6/2021 |
| CN | 114166705 | A | 3/2022 |
| CN | 115266350 | A | 11/2022 |
| CN | 115563803 | A | 1/2023 |
| CN | 115855635 | A | 3/2023 |
| DE | 19959916 | A1 | 7/2000 |
| JP | 2002003548 | A | 1/2002 |
| JP | 2012012514 | A | 1/2012 |
| JP | 2016098332 | A | 5/2016 |
| KR | 20190033309 | A | 3/2019 |
| KR | 20210142340 | A | 11/2021 |

OTHER PUBLICATIONS

Xiaoyuan Duan et al., "Improved mechanical, thermal conductivity and low heat build-up properties of natural rubber composites with nano-sulfur modified graphene oxide/silicon carbide", Ceramics International, vol. 48, No. 15, Dec. 31, 2022, pp. 22053-22063.

Bo Yang et al., "Study on Synergistic Reinforcement of NR with Modified Silica/Graphene Oxide", China Rubber Industry, vol. 67, No. 4, Dec. 31, 2020, pp. 272-275.

International Organization for Standardization, "(ISO 37-2005) Rubber, vulcanized or thermoplastic—Determination of tensile stress-strain properties", International Standard, Jul. 15, 2005, Entire document.

* cited by examiner

METHOD FOR EVALUATING REINFORCEMENT EFFECT AND EFFICIENCY OF FILLER ON NATURAL RUBBER BASED ON PARTICLE SIZE OF BOUND RUBBER PARTICLE FORMED BY THE FILLER AND NATURAL RUBBER LATEX

CROSS-REFERENCE TO RELATED APPLICATIONS

This application is a continuation of International Patent Application No. PCT/CN2024/078122, filed on Feb. 22, 2024, which claims the benefit of priority from Chinese Patent Application No. 202410169729.5, filed on Feb. 6, 2024. The content of the aforementioned application, including any intervening amendments thereto, is incorporated herein by reference in its entirety.

TECHNICAL FIELD

This application relates to functional natural rubber composites, and more particularly to a method for evaluating reinforcement effect and efficiency of a filler on natural rubber based on particle size of a bound rubber particle formed by the filler and natural rubber latex.

BACKGROUND

Rubber, a polymer elastomer composed of linear macromolecules or linear macromolecules with branched chains, has advantages of high elasticity, excellent fatigue resistance, superior electrical insulation, and remarkable wear and heat resistances, and thus has been widely used in electronic appliances, transportation, aerospace, agriculture, medical treatment, and daily life. The development of the rubber industry will contribute to the development of many other industries. Therefore, scientific, rapid, standard, and diverse evaluation of the rubber quality will facilitating enhance the service safety of the rubber, which is of great significance in the actual production and life.

The surface properties will directly affect the physical adsorption or chemical bonding between the filler particles and the rubber molecular chains, thereby affecting the interfacial bonding strength, and determining the reinforcement efficiency of the fillers on the rubber matrix. The reinforcement efficiency refers to the reinforcement degree of the fillers on the mechanical property of the rubber matrix in the composite, which is usually expressed as the mechanical property enhancement percentage. In this application, the reinforcement efficiency is quantified by the improvement of modulus at 100% elongation.

At present, there is still a lack of convenient, rapid, intuitive, and scientific evaluation methods for the reinforcement efficiency of rubbers by fillers. In the prior art, the evaluation is performed generally based on analysis of interfacial interaction between the filler particles and the rubber matrix and measurement of the mechanical properties of the vulcanized rubber. The interfacial interaction is evaluated by determining the bound rubber content in the vulcanized rubber or measuring the crosslinking density of the vulcanized rubber. Such method not only needs toxic reagents, such as methylbenzene, but also needs the treatment of rubber for three days, which is time-consuming and laborious. Regarding the latter method, the mechanical properties of the vulcanized rubber, such as tensile strength, tear resistance and wear resistance, are generally measured with reference to national or industry standards, and to-be-tested rubber samples should be processed to meet the size requirement published in the related standards, and then tested in specific test equipment under specific test parameters. The changes of the rubber properties with environmental parameters and time are evaluated through the changes of mechanical indexes or structural parameters. However, this method also struggles with cumbersome sample processing, testing and data processing processes.

Chinese Patent Publication No. 115266350A (filed on Jul. 29, 2022, and published on Nov. 1, 2022) discloses a method for determine compression set of rubber in a medium environment, in which a compression set apparatus is deployed in a simulation environment to evaluate the rubber quality. Such method has the following limitations: (1) it needs the specific apparatus and method, and thus is time- and labor-consuming; (2) it is required calibration experiments before quality evaluation, leading to an extended test cycle; and (3) test results will be affected by specimen dimensions and test conditions.

Chinese Patent Publication No. 115855635A (filed on Nov. 22, 2022, and published on Mar. 28, 2023) proposes a rubber quality evaluation method and system based on analysis of microstructure and appearance of a tensile fracture, in which the tensile fracture is divided into a curved surface area and a rough surface area, and the area ratio of individual characteristic regions is correlated with the tensile strength and elongation at break of the material, so as to qualitatively and quantitatively evaluate the rubber quality. Such method has the following limitations: (1) high instrument cost and complex operation; and (2) the scanning electron microscope-based microstructural analysis is carried out for the selected micro-area, failing to fully reflect the overall microstructural characteristics.

Chinese Patent Publication No. 115563803A (filed on Oct. 25, 2022, and published on Jan. 3, 2023) provides a method for evaluating service life of natural rubber, in which the service life of the rubber compound is determined by substituting the torque value into the equivalent aging rate equation and the Van't Hoff equation. However, this method requires a large number of pre-experiments for calibration, and the test conditions will significantly affect the test results.

The defects in the current methods for evaluating reinforcement efficiency of fillers on rubber are summarized below: (1) expensive instruments or toxic reagents are needed, resulting in high cost or environmental damage; and (2) the performance parameter-based evaluation involves laborious sample processing, testing, and data processing operations. Therefore, it is necessary to develop new ideas or methods to evaluate reinforcement efficiency of fillers on rubber. Based on the theory of filler reinforcement in rubber, this application provides a new evaluation method, whose results are obviously correlated with the results of the existing evaluation methods. The method of this application is applicable to all common reinforcing fillers used in natural rubbers, and is carried out in the latex state without subsequent treatment, therefore, it is suitable for performance evaluation of rubber products, rapid optimization of rubber formulation, and efficient evaluation of the filler modification effect before the industrial production.

SUMMARY

In view of the absence of a convenient, rapid, intuitive, and scientific method for evaluating the reinforcement effect and efficiency of fillers on rubber in the prior art, the present disclosure provides a method for evaluating reinforcement effect and efficiency of a filler on natural rubber based on a particle size of bound rubber particles formed by the filler and a natural rubber particle in a natural rubber latex, by which the reinforcement effect of the filler on mechanical properties of the vulcanized natural rubber can be quickly and accurately assessed.

Technical solutions of the present disclosure are described as follows.

A method for evaluating a reinforcement effect of a filler on natural rubber based on a particle size of bound natural rubber particles formed by the filler and a natural rubber particle in a natural rubber latex is provided, comprising:

(S1) mixing the natural rubber latex with the filler in a weight ratio of 100:5-0.1 to produce a mixture, wherein bound natural rubber particles are formed by an interaction between the natural rubber particles in the natural rubber latex and the filler; diluting the mixture to obtain a first emulsion;

(S2) measuring an average particle size of the bound natural rubber particle in the first emulsion by using a particle size measurement instrument; measuring an average particle size of natural rubber particles in a second emulsion, wherein the second emulsion is a pure natural rubber latex emulsion without the filler, and the second emulsion is the same as the first emulsion in terms of a concentration of the natural rubber particles; and calculating a particle size ratio x according to $x=d/d_1$, wherein d represents the average particle size of the bound natural rubber particle in the first emulsion, and $d_1$ represents the average particle size of the natural rubber particles in the second emulsion;

(S3) evaluating a reinforcement effect of the filler on natural rubber based on the particle size ratio, wherein when the particle size ratio x is equal to or larger than 1.14, the reinforcement effect of the filler on the natural rubber is determined to be strong; when the particle size ratio x ranges from 1 to 1.07, the reinforcement effect of the filler on the natural rubber is determined to be weak; and when the particle size ratio x is larger than 1.07 and less than 1.14, the reinforcement effect of the filler on the natural rubber is determined to be medium.

In an embodiment, in step (S1), the mixture is diluted such that a concentration of the bound natural rubber particles in the first emulsion is within a detection range of the particle size measurement instrument.

In an embodiment, in step (S1) and step (S2), the first emulsion and the second emulsion are in a stable state without emulsion breaking.

A method for evaluating a reinforcement efficiency of a filler on natural rubber based on a particle size of bound natural rubber particles formed by the filler and a natural rubber particle in a natural rubber latex is provided, comprising:

(SI) mixing the natural rubber latex with the filler in a weight ratio of 100:5-0.1 to produce a mixture, wherein bound natural rubber particles are formed by an interaction between the natural rubber particles in the natural rubber latex and the filler, diluting the mixture to obtain a first emulsion;

(SII) measuring an average particle size of the bound natural rubber particle in the first emulsion by using a particle size measurement instrument; measuring an average particle size of natural rubber particles in a second emulsion, wherein the second emulsion is a pure natural rubber latex emulsion without the filler, and the second emulsion is the same as the first emulsion in terms of a concentration of the natural rubber particles in the natural rubber latex; calculating a particle size ratio x according to $x=d/d_1$, wherein d represents the average particle size of the bound natural rubber particle in the first emulsion, and $d_1$ represents the average particle size of the natural rubber particles in the second emulsion;

(SIII) evaluating a reinforcement effect of the filler on natural rubber based on the particle size ratio, wherein when the particle size ratio x is equal to or larger than 1.14, the reinforcement effect of the filler on the natural rubber is determined to be strong; when the particle size ratio x ranges from 1 to 1.07, the reinforcement effect of the filler on the natural rubber is determined to be weak; and when the particle size ratio x is larger than 1.07 and less than 1.14, the reinforcement effect of the filler on the natural rubber is determined to be medium;

(SIV) preparing at least two modified fillers from the filler respectively through at least two different modification techniques used for calculating constants; measuring an average particle size x of bound natural rubber particles formed by the natural rubber particles in the natural rubber latex and one of the at least two modified fillers used for calculating constants according to steps (SI)-(SII), respectively;

preparing at least two natural rubber vulcanizates respectively filled with one of the at least two modified fillers used for calculating constants; measuring a value y of stress at definite elongation of one of the at least two natural rubber vulcanizates filled with one of the at least two modified fillers used for calculating constants; and plugging one of the at least two obtained y values and the corresponding one of the at least two particle size ratio x values into the following formula to calculate constants a and b, so as to obtain a function expression for evaluating the reinforcement efficiency of the filler on the natural rubber: $y=a+bx$; and (SV) measuring an average particle size of bound natural rubber particle formed by the natural rubber particles in the natural rubber latex and a modified filler from the filler obtained through another modification technology to be tested according to steps (SI)-(SII), and then obtaining a particle size ratio $x_t$;

substituting the particle size ratio $x_t$ into the function expression obtained in step (SIV) to calculate a corresponding value $y_t$ of stress at definite elongation of a natural rubber vulcanizate filled with the modified filler to be tested;

measuring a value y' of stress at definite elongation of a natural rubber vulcanizate without the modified filler to be tested; and calculating the reinforcement efficiency R according to the following formula:

$$R = [(y_t - y')/y'] \cdot 100\%;$$

wherein when R≤10%, the reinforcement efficiency of the modified filler to be tested on the natural rubber is determined to be weak; when R≥20%, the reinforcement efficiency of the modified filler to be tested on the natural rubber is determined to be strong; and when 20%>R>10%, the reinforcement efficiency of the modified filler to be tested on the natural rubber is determined to be medium.

In an embodiment, in step (SI), the mixture is diluted such that a concentration of the bound natural rubber particles in the first emulsion is within a detection range of the particle size measurement instrument.

In an embodiment, in each of the emulsion for measuring an average particle size of bound natural rubber particles is in a stable state without emulsion breaking.

In an embodiment, in each of the natural rubber vulcanizates, for measurement of stress at definite elongation, a weight ratio of a corresponding modified filler to the natural rubber is the same as a weight ratio of the filler to the natural rubber in the natural rubber latex in step (SI).

Compared to the prior art, the present disclosure has the following beneficial effects.

(1) The present disclosure can quickly and accurately judge the reinforcement effect and reinforcement efficiency of fillers on natural rubber. On the one hand, the present disclosure can provide a scientific, accurate, fast, and efficient method for evaluating a modification effect of fillers. On the other hand, the present disclosure lays the foundation of a scientific, accurate, fast and, efficient optimization of rubber formulations. The present disclosure has important significance to promote applications of fillers in the field of high-performance natural rubber.

(2) The present disclosure is applicable to reinforcement fillers commonly used for the natural rubber, such as graphene oxide, carbon black, and silicon dioxide. The present disclosure is also suitable for vulcanized natural rubber prepared by different preparation methods, such as mechanical blending method and solution blending method, which has strong adaptability.

(3) A preparation method of test samples of the present disclosure is simple, green, and environmentally friendly, and has no harsh requirements. The equipment used in the present disclosure are conventional and can be replaced, which is simple, green and fast.

BRIEF DESCRIPTION OF THE DRAWINGS

The accompanying drawings herein are incorporated into the specification to form part of the specification, showing embodiments consistent with the present disclosure and illustrating principles of the present disclosure in company with the description.

In order to illustrate the technical solutions of this application or the prior art more clearly, the accompanying drawings required in the description of embodiments or the prior art will be briefly introduced below. It is obvious that the following accompanying drawings only show some embodiments of this application, and for those of ordinary skill in the art, other relevant accompanying drawings can also be obtained according to these drawings without making creative effort.

FIG. 1 shows the function expression of the reinforcement efficiency of the graphene oxide on natural rubber prepared by various processes based on the particle size of the bound rubber particles form by graphene oxide and natural rubber latex obtained in Examples 1-2. The function expression of the reinforcement efficiency of graphene oxides modified through three modifying agents on natural rubbers is expressed as: y=a+bx, where y represents a stress at definite elongation of a natural rubber vulcanizate filled with the graphene oxide; x represents a particle size ratio and is expressed as: particle size ratio=(an average particle size of a bound natural rubber particle formed by modified graphene oxide obtained by different modifying processes and natural rubber particle in the natural rubber latex)/(an average particle size of a natural rubber particle formed by the natural latex with the same concentration without graphene oxide). a and b are constants, where a=−1.747, and b=5.607. Based on the function expression, the reinforcement efficiency of different modified graphene oxides obtained by different weight ratios of the same modifier and graphene oxide on natural rubber can be obtained through the particle size ratio x expressed as: particle size ratio x=(the average particle size of the bound natural rubber particles formed by modified graphene oxide obtained by different modifying processes and natural rubber particle in the natural rubber latex)/(the average particle size of the natural rubber particles formed by the natural latex with the same natural rubber concentration without graphene oxide). A stress at definite elongation y of corresponding natural rubber vulcanizate can be obtained, and then the reinforcement efficiency R is obtained. It can be seen that, the calculated stress at definite elongation is consistent with an actual stress at definite elongation, indicating that the method for evaluating reinforcement effect and efficiency of the filler on the natural rubber of the present disclosure has high accuracy. In addition, compared to the traditional evaluation method based on the bound rubber content and the evaluation method based on the crosslinking density of vulcanized natural rubber, the present disclosure is time- and labor-saving and environmentally friendly.

In FIG. 2, a (001) crystal plane peak of graphene oxide (GO) is at 9°, where the 2θ of cetyl trimethyl ammonium bromide-modified graphene oxide/natural rubber (GC) and tween-20-modified graphene oxide/natural rubber (GT) are smaller, showing that natural rubber (NR) molecular chain is successfully inserted between GO sheets, leading to a larger distance between each two GO sheets. 19° is a wide peak of NR itself, which is shifted, indicating that an introduction of GO particles makes the lattice parameters of NR smaller, amorphous part decreases, and the 2θ increases. The wide peak shift in NR/GC spectra is more significant, indicating that the interaction between NR and modified GO in this system is largest among the three rubber composites, followed by GT, and the worst is GS, which is effectively corresponding to the average particle size of the bound natural rubber particles formed by modified graphene oxide and the natural rubber particle in the natural rubber latex, and is further corresponding to the performance of the vulcanized natural rubber, verifying the accuracy of the evaluation method of the present disclosure.

FIG. 3 shows that under a strong interface interaction, the particle size of the bound natural rubber particle formed by modified GO and the natural rubber particle in the natural rubber latex is larger than that of the bound natural rubber particles formed by un-modified GO and the natural rubber particle in the natural rubber latex. When the interfacial interaction is weak, the particle size of the bound natural rubber particles formed by GO and the natural rubber particle in the natural rubber latex tends to be more similar to the particle size of pure natural rubber latex, therefore, the particle size ratio of the particles tends to be 1. When the interfacial interaction is strong, there is an interfacial interaction between the modified GO and the natural rubber particle in the natural rubber latex, resulting in the adsorption of modified GO on the surface of the natural rubber particle in the natural rubber latex, therefore, the average particle size of the bound natural rubber particles formed by the modified GO and the natural rubber particle in the natural latex increases, and the particle size ratio of the particles increases, reaching a maximum of 1.18, which is shown in FIG. 1.

DETAILED DESCRIPTION OF EMBODIMENTS

Figure 1:
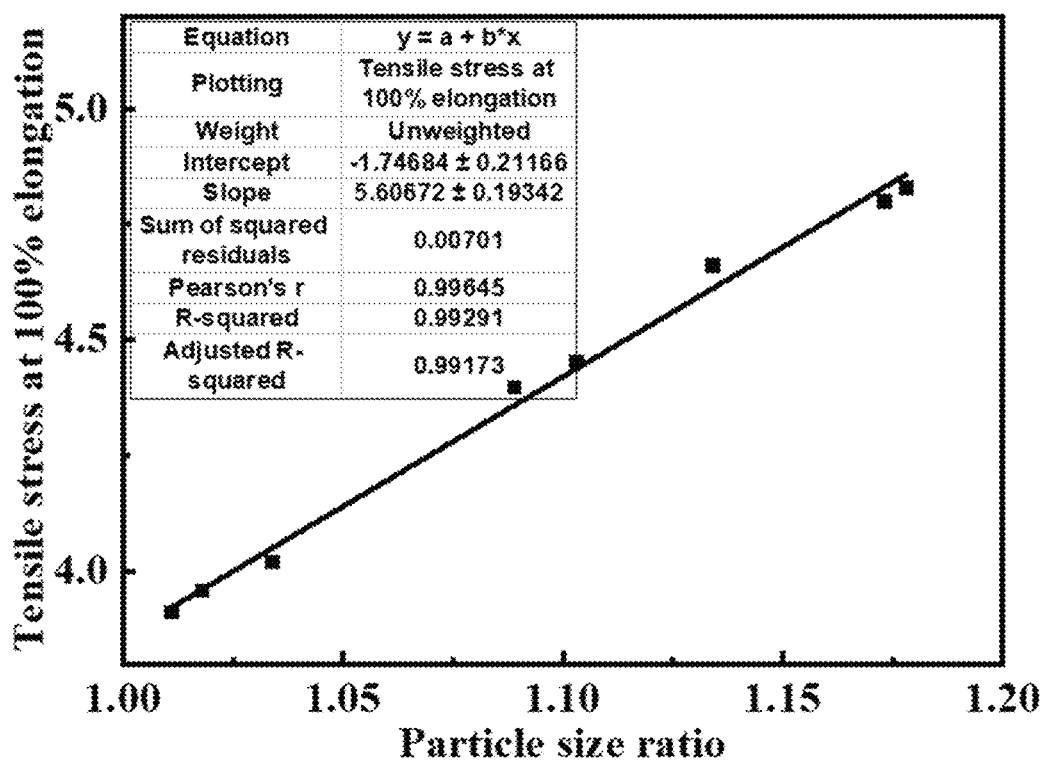
FIG. 1 shows a function expression of a reinforcement efficiency of graphene oxide on natural rubber prepared by various processes based on a particle size of a bound natural rubber particle formed by the graphene oxide and a natural rubber latex obtained in Examples 1-2.

To make the above object, features and advantages of the present disclosure more clearly, the present disclosure will be further described below. It should be noted that, the embodiments and features in the embodiments of the present disclosure can be combined in the absence of conflict.

Many specific details are described below to facilitate a complete understanding of the present disclosure, but the present disclosure may also be implemented in other ways different from the description herein. It is obvious that embodiments herein are only part of embodiments of the present disclosure, rather than all embodiments.

The present disclosure provides a method for evaluating a reinforcement effect of a filler on natural rubber based on a particle size of bound natural rubber particles formed by the filler and a natural rubber particle in a natural rubber latex, including the following steps.

(S1) The natural rubber latex and the filler are mixed in a weight ratio of 100:5-0.1 to produce a mixture, wherein bound natural rubber particles are formed by an interaction between the natural rubber particles in the natural rubber latex and the filler. The mixture is diluted to obtain a first emulsion.

(S2) An average particle size of the bound natural rubber particles in the first emulsion is measured by using a particle size measurement instrument, and an average particle size of a natural rubber particle in a second emulsion is measured, where the second emulsion is a pure natural rubber latex without the filler and the second emulsion is the same as the first emulsion in terms of a concentration of the natural rubber particles. A particle size ratio x is calculated according to $x=d/d_1$, where d represents the average particle size of the bound natural rubber particles in the first emulsion, and $d_1$ represents the average particle size of the natural rubber particle in the second emulsion.

(S3) The particle size ratio x is evaluated, where when the particle size ratio x is equal to or larger than 1.14, the reinforcement effect of the filler on the natural rubber is determined to be strong; when the particle size ratio x ranges from 1 to 1.07, the reinforcement effect of the filler on the natural rubber is determined to be weak; and when the particle size ratio x is larger than 1.07 and less than 1.14, the reinforcement effect of the filler on the natural rubber is determined to be medium.

The present disclosure also provides a method for evaluating a reinforcement efficiency of a filler on natural rubber based on a particle size of bound natural rubber particles formed by the filler and a natural rubber particle in a natural rubber latex is provided, including the following steps.

(SI) The natural rubber latex and the filler are mixed in a weight ratio of 100:5-0.1 to produce a mixture, where bound natural rubber particles are formed by an interaction between the natural rubber particles in the natural rubber latex and the filler. The mixture is diluted to obtain a first emulsion.

(SII) An average particle size of the bound natural rubber particle in the first emulsion is measured by using a particle size measurement instrument, and an average particle size of natural rubber particles in a second emulsion where the second emulsion is a pure natural rubber latex emulsion without the filler. A particle size ratio x is calculated according to $x=d/d_1$, where d represents the average particle size of the bound natural rubber particles in the first emulsion, and $d_1$ represents the average particle size of the natural rubber particles in the second emulsion.

(SIII) The particle size ratio of the particles x is estimated, where when the particle size ratio x is equal to or larger than 1.14, the reinforcement effect of the filler on the natural rubber is determined to be strong; when the particle size ratio x ranges from 1 to 1.07, the reinforcement effect of the filler on the natural rubber is determined to be weak; and when the particle size ratio x is larger than 1.07 and less than 1.14, the reinforcement effect of the filler on the natural rubber is determined to be medium.

(SIV) At least two modified fillers are prepared from the filler respectively through at least two different modification techniques used for calculating constants. An average particle size x of bound natural rubber particles formed by the natural rubber particles in the natural rubber latex and one of the at least two modified fillers used for calculating constants is measured according to steps (SI)-(SII), respectively.

At least two natural rubber vulcanizates respectively filled with one of the at least two modified fillers used for calculating constants are prepared. A value y of stress at definite elongation of one of the at least two natural rubber vulcanizates filled with one of the at least two modified fillers used for calculating constants is measured. The one of the at least two obtained y values and the corresponding one of the at least two particle size ratio x values are plugged, respectively, into the following formula to calculate constants a and b, so as to obtain a function expression for evaluating the reinforcement efficiency of the filler on the natural rubber:

$$y = a + bx.$$

According to steps (SI)-(SII), an average particle size of bound natural rubber particles formed by the natural rubber particles in the natural rubber latex and a modified filler from the filler obtained through another modification technology to be tested is measured, and then a particle size ratio $x_t$ is obtained. The particle size ratio $x_t$ is substituted into the function expression obtained in step (SIV) to calculate a corresponding value $y_t$ of stress at definite elongation of a natural rubber vulcanizate filled with the modified filler to be tested. A value y' of stress at definite elongation of a natural rubber vulcanizate without the modified filler to be tested is measured. The reinforcement efficiency R is calculated according to the following formula: $R=[(y_t-y')/y']\cdot 100\%$, where when R≤10%, the reinforcement efficiency of the modified filler to be tested on the natural rubber is determined to be weak; when R≥20%, the reinforcement efficiency of the modified filler to be tested on the natural rubber is determined to be strong; and when 20%>R>10%, the reinforcement efficiency of the modified filler to be tested on the natural rubber is determined to be medium.

In the methods above, in step (SI), the mixture is diluted such that a concentration of the bound natural rubber particles in the first emulsion is within a detection range of the particle size measurement instrument.

In an embodiment, in each of the emulsion for measuring an average particle size of bound natural rubber particles is in a stable state without emulsion breaking.

In an embodiment, in each of the natural rubber vulcanizates for measurement of stress at definite elongation, a weight ratio of a corresponding modified filler to the natural rubber is the same as a weight ratio of the filler to the natural rubber in the natural rubber latex in step (SI).

Specific embodiments of the present disclosure are described as follows.

Example 1

(S1) Cetyl trimethyl ammonium bromide, sodium dodecyl sulfate, and tween-20 were used to modify graphene oxide (GO), respectively, and three modified GO were obtained and respectively named GC, GS, and GT. Natural rubber latex and the three modified GO were mixed in a weight ratio of 100:0.5, respectively, followed by being diluted to obtain a first GC emulsion, a first GS emulsion, and a first GT emulsion with a concentration of 2.5 mg/L were prepared.

(S2) An average particle size of bound natural rubber particles of each of the first GC emulsion, the first GS emulsion, and the first GT emulsion were measured by using a particle size analyzer. In this embodiment, the average particle size of natural rubber particles was 369.7 μm. The average particle size and corresponding particle size ratio x of the bound natural rubber particles formed by each of natural rubber latexes filled with GC, GS, and GT were shown in Table 1.

(S3) A particle size of the bound natural rubber particles obtained in step (S2) increased, where a size of the bound natural rubber particle in GC modifying system was the biggest, showing that an adsorption of the GC and the natural rubber particles in the natural rubber latex was the strongest. In this embodiment, the particle size ratio x of the GC modifying system and the pure natural rubber particle was 1.089, showing that this filler had an obvious reinforcement effect on the natural rubber vulcanizate prepared by various processes. Test results showed that the stress at 100% elongation y' of the pure natural rubber vulcanizate was 3.866 MPa, and the stress at 100% elongation y of GC/NR was 4.397 MPa, and R=[(4.397−3.866)/3.866]·100%=13.7%, which was consistent with the result of reinforcement effect obtained by the method of the present disclosure.

(S4) After mixing of the natural rubber latex and each of the three modified GOs in the weight ratio of 100:0.5, 10 wt. % of a flocculating agent $CaCl_2$ solution was added for emulsion breaking, followed by drying at 50° C. to a constant weight and being subjected to internal mixing at 110° C. and 40 rpm for 4 min in an internal mixer. 2 g of the vulcanization accelerator N-(oxydiethylene)-2-benzothiazole sulfenamide, 2 g of the antioxidant N-(1-methylisopentyl)-N'-phenyl-p-phenylenediamine, 2 g of the anti-aging agent 2,2,4-trimethyl-1,2-dihydroquinoline were mixed for 4 min, and then 5 g of the activator zinc oxide and 2 g of the softener stearic acid were mixed for 4 min, and then 60 g of the reinforcing filler carbon black was added and mixed for 4 min, followed by discharging of the rubber mixture.

After the rubber mixture was cooled to the room temperature, the rubber mixture was subjected to an open mill for open milling at 60° C. After uniform dispersion, 2 g of sulfur was added and mixed uniformly, followed by mill run until the rubber mixture had no bubble, and the open milling lasted for 10 min. The rubber mixture was placed for 24 h and then was placed in a mold, followed by vulcanization at 150° C. and 15 MPa for 5 min ($t_{c90}$), and three natural rubber vulcanizates respectively filled with one of the three modified GOs were obtained, where $t_{c90}$ was measured by a rubber processing analyzer (RPA). The three natural rubber vulcanizates were subjected to tensile test to test the stress at definite elongation through a universal tensile testing machine (AL-7000-SGD, Gotech Testing Machines Co., Ltd). Testing standard of the tensile performance was ISO 37-2005, and the tensile rate of the tensile test was 500 mm/min.

Figure 2:
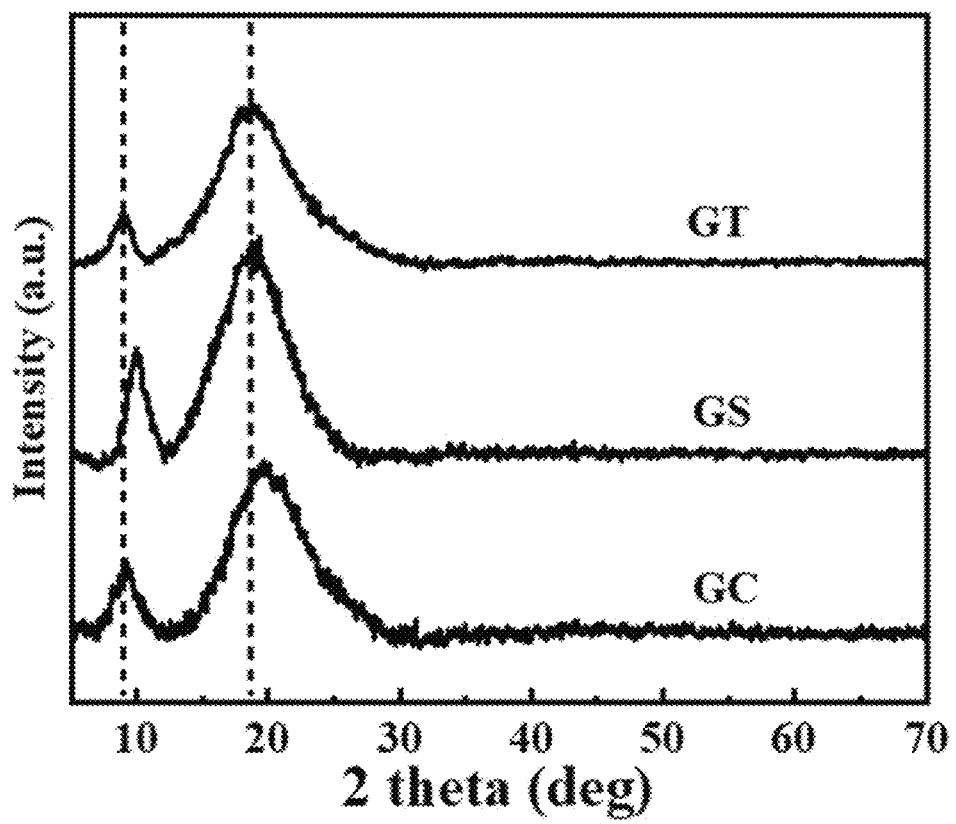
FIG. 2 shows X-ray diffraction (XRD) curves of three rubber composites of modified graphene oxide/natural rubber of Example 1.
Figure 3:
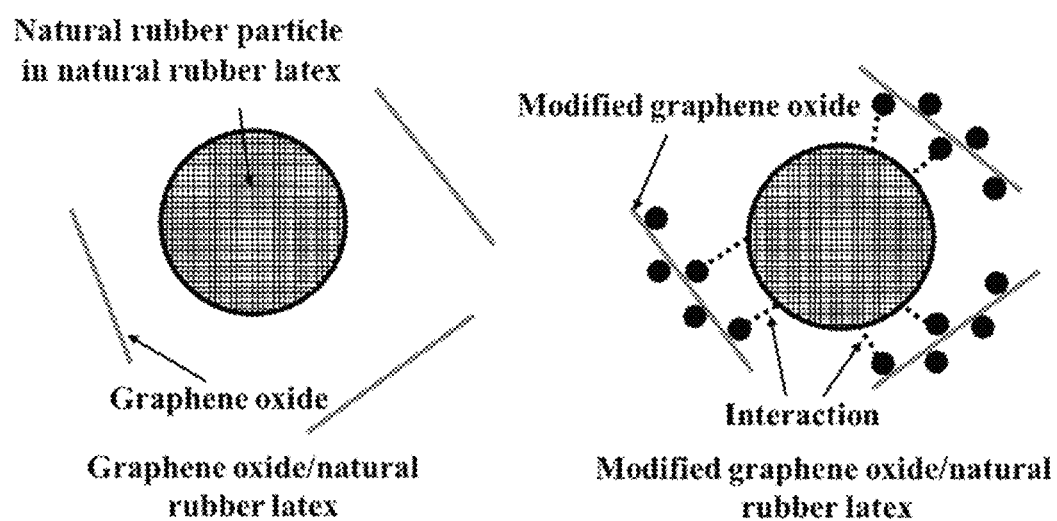
FIG. 3 shows a particle size change of graphene oxide/natural rubber and modified graphene oxide/natural rubber of Example 1.

The function expression of the reinforcement efficiency R of the three modified GOs was expressed as: y=a+bx, where y represented the stress at definite elongation of natural rubber vulcanizate filled with GO, x represented the particle size ratio and was expressed as: particle size ratio=(the average particle size of bound rubber particles formed by modified graphene oxide obtained by different modifying processes and the natural rubber particles in the natural rubber latex)/(the average particle size of the rubber particle formed by the pure natural rubber latex). a and b are constants, where a=−1.747, and b=5.607. Example 2 used such function expression to calculate the stress at definite elongation of natural rubber vulcanizates filled with different modified GOs, and results were shown in FIG. 1. In an embodiment, the filler in the natural rubber vulcanizates of GC modifying system limited the number of rubbers to the maximum, and the GC modifying system had the maximum bound rubber content. Referring to FIG. 2, the interfacial interaction between the GC and natural rubber in natural rubber filled with GC was the strongest, showing that rule of the present disclosure was clearly reflected in the natural rubber mixture, which was effectively corresponding to the average particle size of the bound rubber particles formed by modified GO and the natural rubber particles in the natural rubber latex, and then corresponding to the properties of the natural rubber vulcanizates and also verified the reliability of the evaluation method of the present disclosure.

Table 1 A Particle Size Ratio of the Particles in First Emulsions and a Stress at 100% Elongation, a Stress at 300% Elongation, Bound Rubber Content, and a Crosslinking Density of Vulcanized Natural Rubber

| Samples | GC | GS | GT |
|---|---|---|---|
| Particle size of the bound natural rubber particles (μm) | 402.6 | 376.3 | 382.4 |
| Stress at 100% elongation y (MPa) stress at | 4.397 | 3.958 | 4.020 |
| Stress at 300% elongation (MPa) | 20.002 | 18.844 | 18.877 |
| Bound rubber content (%) | 32.38 | 28.88 | 29.30 |
| Crosslinking density ($*10^{-4}$ mol/cm$^3$) | 5.806 | 5.541 | 5.595 |
| Particle size ratio x | 1.089 | 1.018 | 1.034 |

Example 2

(S1) The surface modifier Cetyl trimethyl ammonium bromide was used to modify GO in different weight ratios of Cetyl trimithyl ammonium bromide and GO, and the weight ratios of Cetyl trimithyl ammonium bromide and GO were 1:1, 2:1, 3:1, 4:1, 5:1, and 6:1. Natural rubber latex and modified GO obtained by different modifying processes were mixed uniformly in a weight ratio of 100:0.5, and uniform emulsions with the concentration of 2.5 mg/L were prepared.

(S2) The average particle size of bound rubber particles of each of the emulsion were measured by a particle size analyzer. In this embodiment, the average particle size of the pure natural rubber particles was 369.7 μm. The average particle size and corresponding particle size ratio x were shown in Table 2.

(S3) In this embodiment, the particle size of the bound natural rubber particles formed by modified GO in the weight ratio of Cetyl trimithyl ammonium bromide and the natural rubber in the natural rubber latex of 2:1 was biggest, showing that the adsorption between this modified GO and the natural rubber particles in the natural rubber latex was the strongest. The particle size ratio x of the bound rubber particles of this modified GO and the pure natural rubber particles was x=1.178, showing that this modified GO had strong reinforcement effect on the natural rubber. In this embodiment, the stress at 100% elongation y' of the pure natural rubber vulcanizate was 3.866 MPa, and the stress at 100% elongation y of the modified GO in the weight ratio of Cetyl trimithyl ammonium bromide and the natural rubber in the natural rubber latex of 2:1/NR was 4.453 MPa, and R=[(4.453−3.866)/3.866]·100%= 24.9%, which was consistent with the result of reinforcement effect obtained by the method of the present disclosure. In addition, the particle size of bound rubber particles in the GC modifying system was positively correlated with the changes of the particle size of the natural rubber particles in natural rubber latex, conventional bound rubber content and the change of cross-linking density, showing the reliability of the present disclosure.

(S4) Natural rubber latex and each of the different modified GOs were uniformly mixed in the weight ratio of 100:0.5, 10 wt. % of the flocculating agent $CaCl_2$) solution was added for emulsion breaking, followed by drying at 50° C. to a constant weight, and being subjected to internal mixing at 110° C. and 40 rpm for 4 min in the internal mixer. 2 g of the vulcanization accelerator N-(oxydiethylene)-2-benzothiazole sulfenamide, 2 g of the antioxidant N-(1-methylisopentyl)-N'-phenyl-p-phenylenediamine, 2 g of the anti-aging agent 2,2,4-trimethyl-1,2-dihydroquinoline were mixed for 4 min, and then 5 g of the activator zinc oxide and 2 g of the softener stearic acid were mixed for 4 min, and then 60 g of the reinforcing filler carbon black was added and mixed for 4 min, followed by discharging of a rubber mixture. After the rubber mixture was cooled to the room temperature, the rubber mixture was subjected to an open mill for open milling at 60° C. After uniform dispersion, 2 g of sulfur was added and mixed uniformly, followed by mill run until the rubber mixture had no bubble, and the open milling lasted for 10 min. The rubber mixture was placed for 24 h and then was placed in the mold, followed by vulcanization at 150° C. and 15 MPa for 5 min ($t_{c90}$), and the natural rubber vulcanizates filled with different modified GOs were obtained, where $t_{c90}$ was measured by the rubber processing analyzer (RPA). The natural rubber vulcanizates filled with different modified GOs were subjected to tensile test to test the stress at definite elongation through a universal tensile testing machine (AL-7000-SGD, Gotech Testing Machines Co., Ltd). The testing standard of the tensile performance was ISO 37-2005, and the tensile rate of the tensile test was 500 mm/min.

(S5) The function expression of the particle size ratio of the particle and the stress at 100% elongation was expressed as: y=a+bx. According to a=−1.747, and b=5.607 and the particle size ratio x obtained in Example 1, the stress at definite elongation y of the natural rubber vulcanizate filled with modified GO was calculated, and then R=[(y−y')/y']·100% was calculated, and results were shown in Table 2. In can be seen that a calculated value of the stress at definite elongation was highly consistent with an actual value, indicating that the function expression can be used to evaluate the reinforcement efficiency of fillers in natural rubber composites based on the particle size of the bound rubber particles formed by the natural rubber particles in the natural rubber latex, which avoids subsequent processing and is easy to evaluate rubber products before industrial production, rapid optimization of rubber formula and efficient evaluation of the modification effect of fillers.

TABLE 2

A particle size ratio of the particles in emulsions and a stress at 100% elongation, a stress at 300% elongation, bound rubber content and a crosslinking density of natural rubber vulcanizate

| Samples | 1:1 | 2:1 | 3:1 | 4:1 | 5:1 | 6:1 |
|---|---|---|---|---|---|---|
| Particle size of the bound rubber particles (μm) | 407.9 | 435.4 | 433.8 | 419.2 | 402.6 | 373.7 |
| Stress at 100% elongation y (MPa) | 4.453 | 4.829 | 4.799 | 4.661 | 4.397 | 3.911 |
| Stress at 300 % elongation (MPa) | 20.211 | 20.450 | 20.369 | 20.345 | 20.002 | 18.880 |
| Bound rubber content (%) | 32.99 | 33.66 | 33.37 | 33.18 | 32.38 | 30.11 |
| Crosslinking density (*$10^{-4}$ mol/cm$^3$) | 5.833 | 5.877 | 5.869 | 5.849 | 5.806 | 5.706 |
| Particle size ratio x | 1.103 | 1.178 | 1.173 | 1.134 | 1.089 | 1.011 |
| Calculated stress at 100% elongation y (MPa) | 4.437 | 4.858 | 4.830 | 4.611 | 4.359 | 3.921 |

Described above are only specific embodiments of this application, which makes those skilled in the art understand or realize the present disclosure. Although detailed descriptions are made by reference to the foregoing embodiments, it should be understood by those skilled in the art that they can modify the technical solutions of the foregoing present disclosure, or make equivalent replacements for some or all of the technical features. Such modifications and equivalent replacements made without departing the scope of the technical solutions of the present disclosure shall fall within the scope of the of this application defined by the appended claims.

What is claimed is:

1. A method for screening a filler with a reinforcement effect on natural rubber based on a particle size of bound natural rubber particles formed by the filler and a natural rubber particle in a natural rubber latex, comprising:
   (S1) mixing the natural rubber latex respectively with a plurality of to-be-tested fillers in a weight ratio of 100:5-0.1 to produce a plurality of mixtures, wherein the bound natural rubber particles are formed by an interaction between the natural rubber particle in the natural rubber latex and each of the plurality of to-be-tested fillers; and diluting the plurality of mixtures to obtain a plurality of first emulsions, respectively;
   (S2) measuring an average particle size of the bound natural rubber particles in each of the plurality of first emulsions by using a particle size measurement instrument; measuring an average particle size of natural rubber particles in a second emulsion, wherein the second emulsion is a pure natural rubber latex emulsion, and the second emulsion is the same as the first emulsion in terms of a concentration of the natural rubber particles; and calculating a particle size ratio x according to $x=d/d_1$, wherein d represents the average particle size of the bound natural rubber particles in each of the plurality of first emulsions, and $d_1$ represents the average particle size of the natural rubber particles in the second emulsion;
   (S3) evaluating a reinforcement effect of the plurality of to-be-tested fillers on natural rubber based on the particle size ratio, wherein when the particle size ratio x is equal to or larger than 1.14, the reinforcement effect of a corresponding to-be-tested filler on the natural rubber is determined to be strong; when the particle size ratio x ranges from 1 to 1.07, the reinforcement effect of the corresponding to-be-tested filler on the natural rubber is determined to be weak; and when the particle size ratio x is larger than 1.07 and less than 1.14, the reinforcement effect of the corresponding to-be-tested filler on the natural rubber is determined to be medium; and
   screening a filler with the particle size ratio x equal to or larger than 1.14 from the plurality of to-be-tested fillers for compounding with the natural rubber latex to prepare a rubber composite.

2. The method of claim 1, wherein in step (S1), the plurality of mixtures are diluted such that a concentration of the bound natural rubber particles in each of the plurality of first emulsions is within a detection range of the particle size measurement instrument.

3. The method of claim 1, wherein in step (S1) and step (S2), the plurality of first emulsions and the second emulsion are each in a stable state without emulsion breaking.

4. A method for screening a filler with a reinforcement effect on natural rubber based on a particle size of bound natural rubber particles formed by the filler and a natural rubber particle in a natural rubber latex, comprising:
   (SI) mixing the natural rubber latex respectively with a plurality of to-be-tested fillers in a weight ratio of 100:5-0.1 to produce a plurality of mixtures, wherein bound natural rubber particles are formed by an interaction between the natural rubber particle in the natural rubber latex and each of the plurality of to-be-tested fillers, diluting the plurality of mixtures to obtain a plurality of first emulsions, respectively;
   (SII) measuring an average particle size of the bound natural rubber particles in each of the plurality of first emulsions by using a particle size measurement instrument; measuring an average particle size of natural rubber particles in a second emulsion, wherein the second emulsion is a pure natural rubber latex emulsion without the filler, and the second emulsion is the same as the first emulsion in terms of a concentration of the natural rubber particles in the natural rubber latex; calculating a particle size ratio x according to $x=d/d_1$, wherein d represents the average particle size of the bound natural rubber particles in each of the plurality of first emulsions, and $d_1$ represents the average particle size of the natural rubber particles in the second emulsion;
   (SIII) evaluating a reinforcement effect of the plurality of to-be-tested fillers on natural rubber based on the particle size ratio, wherein when the particle size ratio x is equal to or larger than 1.14, the reinforcement effect of a corresponding to-be-tested filler on the natural rubber is determined to be strong; when the particle size ratio x ranges from 1 to 1.07, the reinforcement effect of the corresponding to-be-tested filler on the natural rubber is determined to be weak; and when the particle size ratio x is larger than 1.07 and less than 1.14, the reinforcement effect of the corresponding to-be-tested filler on the natural rubber is determined to be medium; and
   screening a filler with the particle size ratio x equal to or larger than 1.14 from the plurality of to-be-tested fillers;
   (SIV) preparing at least two modified fillers from the screened filler respectively through at least two different modification techniques used for calculating constants; measuring an average particle size x of bound natural rubber particles formed by the natural rubber particles in the natural rubber latex and one of the at least two modified fillers used for calculating constants according to steps (SI)-(SII), respectively; preparing at least two natural rubber vulcanizates respectively filled with one of the at least two modified fillers used for calculating constants; measuring a value y of stress at definite elongation of one of the at least two natural rubber vulcanizates filled with one of the at least two modified fillers used for calculating constants;
   plugging one of the at least two obtained y values and the corresponding one of the at least two particle size ratio x values into the following formula to calculate constants a and b, so as to obtain a function expression for evaluating the reinforcement efficiency of the screened filler on the natural rubber:

$$y = a + bx;$$

(SV) measuring an average particle size of bound natural rubber particles formed by the natural rubber particles in the natural rubber latex and each of a plurality of to-be-tested modified fillers from the screened filler respectively obtained through a plurality of to-be-tested modification technologies according to steps (SI)-(SII), and then obtaining a particle size ratio $x_t$;

substituting the particle size ratio $x_t$ into the function expression obtained in step (SIV) to calculate a corresponding value $y_t$ of stress at definite elongation of each of a plurality of natural rubber vulcanizates respectively filled with the plurality of to-be-tested modified fillers;

measuring a value y' of stress at definite elongation of a filler-free natural rubber vulcanizate; and calculating the reinforcement efficiency R according to the following formula:

$$R = [(y_t - y')/y'] \cdot 100\%;$$

wherein when R≤10%, the reinforcement efficiency of a corresponding to-be-tested modified filler on the natural rubber is determined to be weak; when R>20%, the reinforcement efficiency of the corresponding to-be-tested modified filler on the natural rubber is determined to be strong; and when 20%>R>10%, the reinforcement efficiency of the corresponding to-be-tested modified filler on the natural rubber is determined to be medium; and screening a modified filler with the reinforcement efficiency R equal to or larger than 20% from the plurality of to-be-tested modified fillers for compounding with the natural rubber latex and vulcanization to prepare a filler-modified natural rubber vulcanizate.

5. The method of claim 4, wherein in step (SI), the plurality of mixtures are diluted such that a concentration of the bound natural rubber particles in each of the plurality of first emulsions is within a detection range of the particle size measurement instrument.

6. The method of claim 4, wherein each of the plurality of first emulsions for measuring an average particle size of bound natural rubber particles is in a stable state without emulsion breaking.

7. The method of claim 4, wherein in each of the natural rubber vulcanizates for measurement of stress at definite elongation in step (SIV), a weight ratio of each of the at least two modified fillers to the natural rubber is the same as a weight ratio of each of the plurality of to-be-tested fillers to the natural rubber in the natural rubber latex in step (SI).

* * * * *